United States Patent [19]

Nakazawa et al.

[11] Patent Number: 4,681,389

[45] Date of Patent: Jul. 21, 1987

[54] LOCK PIN FOR MOUNTING BOARD-MOUNT TYPE CONNECTOR ON BOARD

[75] Inventors: Akira Nakazawa; Shigeru Kikuta; Kihachiro Koike; Kensaku Matsuoka; Yoshimitsu Nishino, all of Tokyo, Japan

[73] Assignees: Hirose Elec. Co., Ltd.; NEC Corporation; Japan Aviation Elec., all of Tokyo, Japan

[21] Appl. No.: 848,314

[22] Filed: Apr. 4, 1986

[30] Foreign Application Priority Data

Apr. 4, 1985 [JP] Japan .................. 60-50182[U]

[51] Int. Cl.⁴ ............................................ H02B 1/02
[52] U.S. Cl. .................................................. 439/557
[58] Field of Search .................................. 339/125, 128

[56] References Cited

U.S. PATENT DOCUMENTS 3,688,635 9/1972 Fegen .................. 339/128 R X
3,719,917 3/1973 Fischer et al. ......... 339/128 R X Primary Examiner—Eugene F. Desmond
Attorney, Agent, or Firm—David G. Rosenbaum

[57] ABSTRACT

A lock pin for mounting a board-mount type connector on a board is formed of an elastic material and comprises an upper lateral arm, a pair of spaced long central legs respectively extending downwardly from the center of the upper lateral arm and a pair of spaced short outside legs respectively extending downwardly from the upper lateral arm along the outsides of the central legs. The central legs are adapted to be inserted into a lock pin mounting opening formed at one member of the connector from the upper surface side of the one member to project from the lower surface side of the one member over a considerable length and be inserted into a lock pin inserting opening of the board. The central legs are respectively formed at the lower ends thereof with side projections to be engaged with the periphery of the lock pin inserting opening. The outside legs are respectively formed at the lower ends thereof with side projections to be engaged with shoulders formed at the periphery of the lock pin mounting opening of the one member.

3 Claims, 5 Drawing Figures (A)  (B)

ial projection 11 and an engaging peripheral projection 12, and further a pair of legs 14 spaced to extend longitudinally downwardly. The legs 14 respectively have at the lower ends engaging projections 15. The lock pin 10 is press-fitted into a lock pin mounting opening 2 formed at an insulating housing member 1 of one member of a board-mount type connector such as, for example, injection molded. In other words, when the pin 10 is inserted from the upper surface side of the housing member 1 into the opening 2 in such a manner that the legs 14 is directed ahead, the peripheral 12 is pressed-fitted into the opening 2, and when the pin 10 is further inserted into the opening 2, the lower peripheral surface of the upper peripheral projection 11 is contacted with the upper surface of the shoulder 3 of the opening 2. Thus, the lock pin 10 is press-fitted fixedly to the housing member 1. At this time, the legs 14 are projected from the lower surface side of the housing member 1 over a considerable length. When the legs 14 thus projected are inserted into corresponding lock pin inserting openings of the board to be mounted with the board-mount type connector, the projections 15 of the legs 14 are elastically engaged with the peripheries of the lock pin inserting openings. Thus, the connector is mounted fixedly on the board.

LOCK PIN FOR MOUNTING BOARD-MOUNT TYPE CONNECTOR ON BOARD

BACKGROUND OF THE INVENTION

1. Field of the Invention

This invention relates to a lock pin for mounting a board-mount type connector on a board such as a printed circuit board.

2. Description of the Prior Art

Heretofore, a method of mounting a board-mount type connector on a board such as a printed circuit board employs as a simple method instead of a screw clamping method a method of press-fitting a lock pin exemplified as shown in FIG. 4 of the accompanying drawings into a mounting opening such as a screw clamping opening of a board. As shown in FIG. 4, the conventional lock pin 10 has an engaging peripheral groove 13 formed between an upper peripheral projection 11 and an engaging peripheral projection 12, and further a pair of legs 14 spaced to extend longitudinally downwardly. The legs 14 respectively have at the lower ends engaging projections 15. The lock pin 10 is press-fitted into a lock pin mounting opening 2 formed at an insulating housing member 1 of one member of a board-mount type connector such as, for example, injection molded. In other words, when the pin 10 is inserted from the upper surface side of the housing member 1 into the opening 2 in such a manner that the legs 14 is directed ahead, the peripheral 12 is pressed-fitted into the opening 2, and when the pin 10 is further inserted into the opening 2, the lower peripheral surface of the upper peripheral projection 11 is contacted with the upper surface of the shoulder 3 of the opening 2. Thus, the lock pin 10 is press-fitted fixedly to the housing member 1. At this time, the legs 14 are projected from the lower surface side of the housing member 1 over a considerable length. When the legs 14 thus projected are inserted into corresponding lock pin inserting openings of the board to be mounted with the board-mount type connector, the projections 15 of the legs 14 are elastically engaged with the peripheries of the lock pin inserting openings. Thus, the connector is mounted fixedly on the board.

When the board-mount type connector has a relatively large size and the thickness $T_1$ of the insulating housing member 1 is relatively large, the abovementioned conventional lock pin 10 can provide sufficient size of the engaging peripheral groove 13 and also provide long length $L_1$ of the legs sufficient to be preferably elastically engaged with the lock pin inserting opening of the opposed board. However, as recent connectors tend to be miniaturized, the thickness of the housing member of the connector is remarkably reduced. When the lock pin is mounted on such thin connector, the construction of the lock pin cannot provide sufficient size of the engaging peripheral groove 13 nor sufficient length $L_1$ of the legs. Therefore, the conventional lock pin of this type cannot be applied to such a minature connector, and relatively complicated screw clamping method must be employed.

An object of this invention is to provide a lock pin which can eliminate the aforementioned drawbacks and disadvantages of the conventional lock pin and can be applied to a miniature board-mount type connector.

SUMMARY OF THE INVENTION

According to this invention, there is provided a lock pin for mounting a board-mount type connector on a board being of an elastic material and comprising an upper lateral arm, a pair of spaced long central legs respectively extending downwardly from the center of the upper lateral arm, and a pair of spaced short outside legs respectively extending downwardly from the upper lateral arm along the outsides of the central legs, the central legs being adapted to be inserted into a lock pin mounting opening formed at one member of the connector from the upper surface side of the one member to project from the lower surface side of the one member over a considerable length and be inserted into a lock pin inserting opening of the board, the central legs being respectively formed at the lower ends thereof with side projections to be engaged with the periphery of the lock pin inserting opening, the outside legs being respectively formed at the lower ends thereof with side projections to be engaged with shoulders formed at the periphery of the lock pin mounting opening of the one member.

This invention will now be described in further detail with regard to preferred embodiments as illustrated in the accompanying drawings.

DESCRIPTION OF THE PREFERRED EMBODIMENTS

Figure 1:
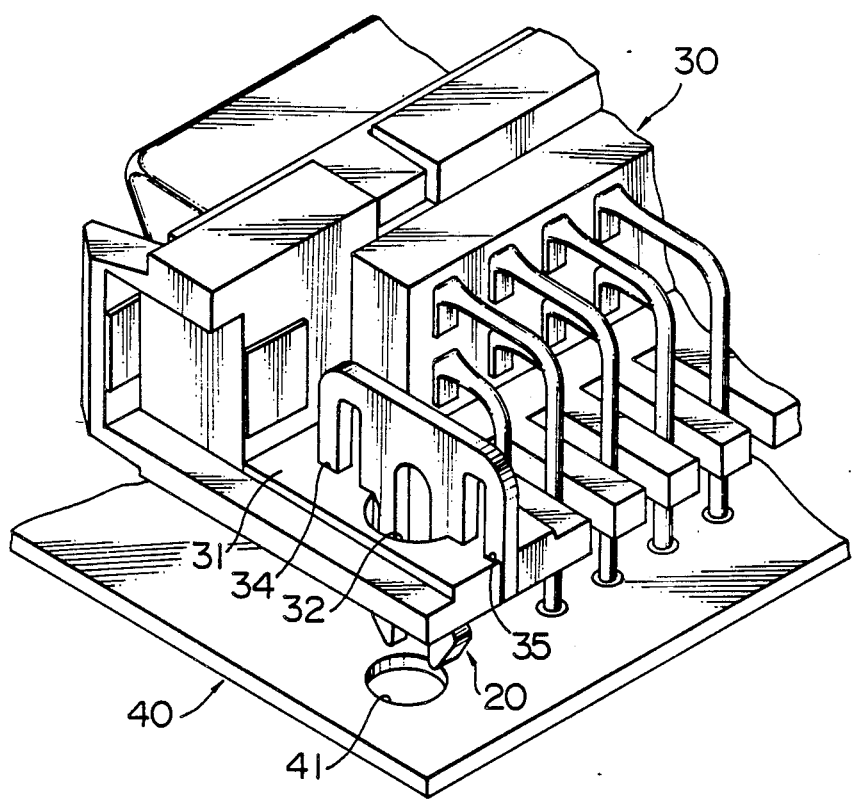
FIG. 1 is a schematic perspective view showing a using example of a lock pin as an embodiment of this invention.

FIG. 1 shows a using example of a lock pin as an embodiment of this invention illustrating a board-mount type connector 30 fixedly mounted on a board 40 such as a printed circuit board by a lock pin 20 of this invention.

Figure 2:
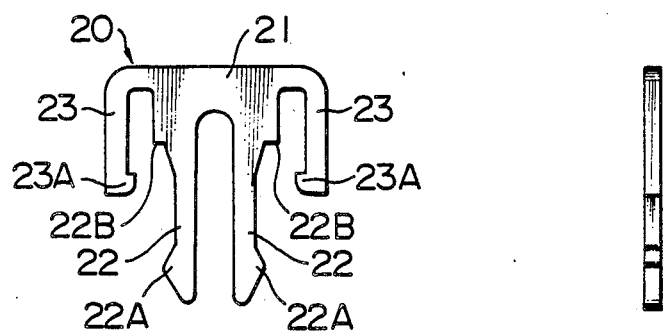
FIGS. 2(A) and 2(B) are front and side views showing the detail of the lock pin of FIG. 1.

The lock pin 20 of this invention is punched, as shown in detail in front and side views of FIGS. 2(A) and 2(B), integrally from an elastic metal material sheet, and has an upper lateral arm 21, a pair of spaced long central legs 22 extending longitudinally downwardly from the center of the arm 21, and a pair of spaced short outside legs 23 extending longitudinally downwardly from the arm 21 along the outsides of the legs 22. The legs 22 are inserted from the upper surface side of the insulating housing base 31 of the boardmount type connector 30 into a lock pin mounting opening 32 formed at the base 31, projected from the lower surface side of the base 31 in the considerable portion, and inserted into a lock pin inserting opening 41 of the board 40. The legs 22 are respectively formed integrally at the lower ends thereof with outside projections 22A to be engaged with the peripheries of the opening 41 of the board 40. Further, the legs 22 are respectively formed integrally at the roots thereof with shoulders 22B to be engaged with the peripheries of the opening 32 at the upper surface of the base 31. The outside legs 23 are respectively formed integrally at the lower ends thereof with inside projections 23A to be engaged with the shoulders 33 (See FIG. 3) formed at the peripheral side of the opening 32 of the base 31.

Figure 3:
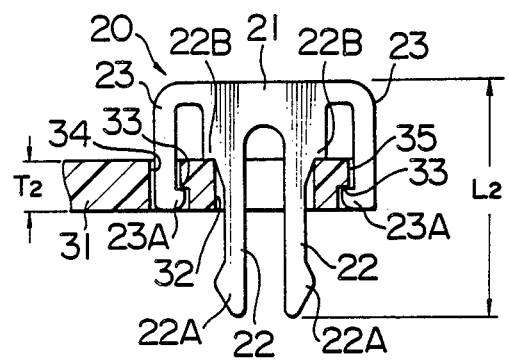
FIG. 3 is a sectional view showing the mounting state of the lock pin of FIG. 1.
Figure 4:
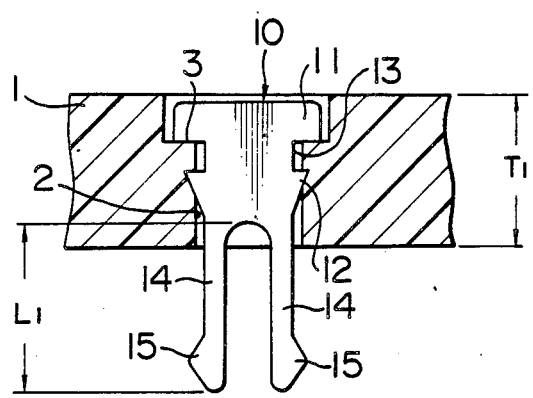
FIG. 4 is a sectional view showing an example of a conventional lock pin.

In the embodiment described above, an inserting opening 34 and inserting groove 35 to be inserted with the ends of the outside legs 23 of the pin 20 are formed, as shown in FIG. 3, at the peripheral sides of the opening 32 of the base 31. The opening 34 and the groove 35 respectively communicate with the shoulders 33.

When the lock pin 20 of the invention is mounted on the insulating housing base 31, the pair of long central legs 22 are first elastically narrowed laterally inwardly to one another, inserted from the upper surface side of the base 31 into the lock pin mounting opening 32, and the pair of short outside legs 23 are then pressed so that the lower ends thereof are inserted into the corresponding opening 34 and the groove 35. At this time, the legs 23 are elastically outwardly expanded by the walls of the opening 34 and the groove 35, elastically snugly closed when the inside projections 23A of the legs 33 respectively override the shoulders 33 and engaged with the shoulders 33. This state is shown in a sectional view in FIG. 3. In this state, the shoulders 33B at the roots of the legs 22 are respectively engaged with the periphery of the opening 32 at the upper surface of the base 31, and the lock pin 20 is held fixedly with the base 31. The legs 22 are projected from the lower surface side of the base 31 over a considerable length. When the legs 22 thus projected are inserted into the lock pin inserting opening 41 of the board 40, the outside projections 22A of the legs 22 are elastically engaged with the periphery of the opening 41, and the board-mount connector 30 is mounted fixedly on the board 40.

In the embodiment described above, the lock pin 20 is formed of an elastic metal material. However, the lock pin may be formed of a plastic material having an elasticity.

Since the lock pin of the invention is constructed as described above, even if the board-mount type connector 30 has a small size and the thickness $T_2$ of the insulating housing base 31 is thin as shown in FIG. 3, the lock pin can be sufficiently mounted on the base 31, and can provide a sufficiently long leg length $L_2$ to be preferably elastically engaged with the lock pin inserting opening 41 of the opposed board 40.

What is claimed is:

1. A lock pin for mounting a board-mount type connector on a board, wherein the board-mount type connector includes one member having an upper surface and a lower surface and a lock pin mounting opening passing through from the upper surface to the lower surface, the one member further having shoulders formed at the periphery of the lock pin mounting opening and below the upper surface, the board having a lock pin inserting opening formed therein correspondingly to the lock pin mounting opening of one member, the lock pin comprising:

an unitary piece of elastic material, said elastic material having an upper lateral arm, a pair of spaced long central legs respectively extending downwardly from the center of said upper lateral arm, and a pair of spaced short outside legs respectively extending downwardly from the upper lateral arm along the outside of said central legs, said central legs being respectively formed at the roots thereof with shoulders to be engaged with the periphery of the lock pin mounting opening at the upper surface of the one member and at the lower ends thereof with side projections to be engaged with the periphery of said lock pin inserting opening of the board, said outside legs being respectively formed at the lower ends thereof with side projections extending therefrom for engaging a lower surface of said shoulders of the one member, whereby said lock pin can be held fixedly with the one member with the central legs being projected from the lower surface side of the one member over a considerable length by inserting the lower ends of said central legs into said lock pin mounting opening from the upper surface side of the one member so that said shoulders at the roots of said central legs are respectively engaged with the upper surface of the one member and said side projections of said outside legs are respectively engaged with said shoulders of the one member, and then the lower ends of said central legs thus projected are adapted to be inserted into said lock pin inserting opening of the board.

2. A lock pin according to claim 1, wherein said elastic material is metal.

3. A lock pin according to claim 1, wherein said elastic material is plastic.

* * * * *